United States Patent [19]

Dionne

[11] 4,060,817
[45] Nov. 29, 1977

[54] PHOTOGRAPHIC APPARATUS WITH LENS FOCUSING SCALE

[75] Inventor: Leonard J. Dionne, Westwood, Mass.

[73] Assignee: Polaroid Corporation, Cambridge, Mass.

[21] Appl. No.: 662,352

[22] Filed: Mar. 1, 1976

[51] Int. Cl.² .......................... G03B 3/00; G03B 13/02
[52] U.S. Cl. .................................... 354/198; 354/219; 354/289
[58] Field of Search ............... 354/198, 199, 219, 289

[56] References Cited

U.S. PATENT DOCUMENTS

| 2,936,690 | 5/1960 | Whitman ............................. 354/198 |
| 3,046,863 | 7/1962 | Bretthauer et al. ............. 354/289 X |
| 3,478,660 | 11/1969 | Land ................................. 354/196 X |
| 3,583,300 | 6/1971 | Johnson et al. ....................... 354/219 |
| 3,914,777 | 10/1975 | Slavitter ............................. 354/196 |
| 3,971,052 | 7/1976 | Plummer ............................. 354/219 |

FOREIGN PATENT DOCUMENTS 512,085  11/1930  Germany ............................. 354/198

OTHER PUBLICATIONS

"Theory & Design of Long-Deflection Constant-- Force Spring Elements", By Votta & Lansdale in *Transactions of ASME*, May, 1952, pp. 439-444.

*Primary Examiner*—John Gonzales
*Attorney, Agent, or Firm*—Kenneth W. Anderson

[57] ABSTRACT

Photographic apparatus including an indicating device bearing indicia for relating to the operator a distance at which a variable focusing lens assembly of the apparatus is focused. The indicating device is coupled to a focusing control system of the apparatus for movement therewith as the lens assembly is moved between distant and nearmost foci to bring the camera into coincidence with a predetermined estimation of a camera-to-subject distance for a photographic scene.

In a preferred embodiment, an image of the indicia is presented in or beneath a field of view of a viewfinder mounted upon the apparatus and serves as a reminder to the operator of the distance at which the lens assembly is focused whereby an error in the focused position of the lens assembly is made obvious to the operator and a proper correction can be made before the shutter of the apparatus is released.

10 Claims, 7 Drawing Figures

PHOTOGRAPHIC APPARATUS WITH LENS FOCUSING SCALE

BACKGROUND OF THE INVENTION

1. Field of the Invention

This invention relates to the field of photography and, more particularly, to a device which may be incorporated with a focusing control system of a photographic apparatus for indicating a distance at which an objective lens of the apparatus is focused.

2. Description of the Prior Art

Conventional low cost photographic cameras are designed to provide a reliable and consistent performance within the range of a photographic environment most often encountered by an amateur photographer. To derive an acceptable high success rate for a "snapshot photograph" for which the cameras are intended, the design of such cameras is tailored not only to meet rigid cost limitations but also to limit the number of adjustments to any exposure mechanism required for any one photograph.

Generally, distance determining devices, e.g., rangefinders, are not provided with conventional inexpensive cameras. Fabrication costs preclude an incorporation of such semi-automatic ranging devices into the cameras. In an attempt to expand the camera's usefulness, recently developed low cost cameras are structured to include mounting devices and electronic circuits for providing flash illumination. In this mode of operation, the scope of range of performance of the cameras is somewhat limited in comparison to their use under ambient conditions. The amateur photographer must remain aware of camera-to-subject distance when the camera is operated in the flash mode. In the flash mode, a light generating capacity of a flashbulb being utilized in generally determined in accordance with the "inverse square law" which assumes that light emanating from the bulb dissipates in proportion to the square of a distance from the source. Furthermore, the amateur photographer is often not mindful of the difference in operational scope of the camera when using artificial illumination as opposed to ambient lighting. Consequently, without the assistance of a device which aids the operator in bringing the camera into coincidence with an optimum distance for photographs taken in the flash mode, a relatively high percentage of exposures made by the amateur photographer are aborted. Therefore, an inexpensive means is required beyond mere admonitions in film package instructions for reminding the photographer to determine the optimum camera-to-subject distance and make the exposures within that range only.

U.S. Pat. No. 3,315,579, issued on Apr. 25, 1967 to E. H. Land for "Dual Mode Control Means" discloses and defines control apparatus whereby an exposure value setting for a shutter mechanism operating under steady state light conditions is established by the use of a built-in photometer. With this arrangement, the diaphragms of the photometer apparatus and the exposure aperture may be adjusted until the area of the exposure aperture is correct for the level of scene brightness. However, the above procedure is applicable only to a scene under steady state lighting conditions or at a level exceeding some minimum value of scene brightness at which the photometer is operative. When the scene brightness is less than the minimum value, proper exposure can be achieved by using a flash bulb. With flash illumination, the area of the exposure aperture is achieved by adjusting the relative position of a pair of movable elements to define a proper aperture as a function of the distance of the subject to the camera. A distance scale is provided therefor by imprinting a pointer and indicia forming a scale graduated respectively in distance units upon a flange of one of the pair of movable elements such that the relative position of the elements defines the area of the exposure aperture for proper exposure of the photographic subject in the flash mode of operation over a range of camera-to-subject distances. The pointer is aligned with one of the distance units at a window provided therefor in a shutter housing of the camera whereby the operator is apprised, when the movable elements have been adjusted, to provide the proper aperture setting for the predetermined camera-to-subject distance, of the distance for which the exposure aperture is set thereby substantially improving the operation of a fixed speed, fixed focus camera in the flash mode.

Camera-to-subject distance determination are also critical where popular priced cameras are designed for use with relatively slower speed film, for instance, color film as compared with black and white film. For such applications, simple, relatively inexpensive, variable focusing lens arrangement which is manually adjustable at distance settings corresponding to the camera operator's estimation of a camera to subject distance and an inexpensive but accurate distance indicator may be combined to aid the operator in accurately focusing the camera over an extended range of camera-to-subject distance.

In the past, operators of conventional low cost cameras having a conventional viewfinder and variable focusing lens have first estimated the camera-to-subject distance and then focused the lens for that distance by aligning a scale graduated in distance units circumferentially arranged about the lens housing with an index mark included upon a face of the camera. In order to focus the lens the operator may find it necessary to lower the camera from the viewing position and look away from the photographic scene during the focusing of the lens. While this may not be an inconvenience for an experienced organized operator, it may disrupt the concentration of the inexperienced amateur who may subsequently discover upon returning the camera to the viewing position that too little or too much information, as it relates to the photographic scene, is presented within the viewfinder and must compensate therefor by moving either the camera or the subject to a new position whereat all of the desired image of the photographic scene is contained within the viewfinder. Much too often, the amateur operator fails to refocus the lens for the new position before releasing the shutter whereby the resulting photographic prints are substantially out of focus.

Frequently, an operator may wish to photograph different views of the same photographic scene. While quickly moving about to each new location, the operator may forget to refocus the lens for each new camera-to-subject distance and continue to operate the camera at a focal setting which is inappropriate for a substantial number of the scenes whereby the resulting photographic prints shall be out of focus. Each time the operator may remember to focus the lens for each new camera-to-subject distance, it shall be necessary for the operator of a camera of this type to lower the camera from the viewing position and turn it to a position whereat the operator may view the alignment of the distance scale with the index mark on the face of the camera and then return the camera to the viewing position before releasing the camera's shutter. As a result, the concentration of the operator may be disrupted and the operator shall be required to recompose the photographic scene within the viewfinder which may be particularly frustrating to the operator and often to the photographic subject.

Therefore, in U.S. Pat. No. 3,583,300, issued on June 8, 1971, to Bruce K. Johnson, for "Photographic Camera with Viewfinder" a photographic camera is disclosed including an adjustable distance scale upon a bezel encompassing a lens of the camera including a viewfinder mounted upon the camera such that an image of the distance scale is presented in or beside a field of view of the viewfinder. This arrangement permits the operator to make a preliminary visual estimate of the camera-to-subject distance and then raise the camera to a viewing position whereat the operator may focus the lens by moving the distance scale to an appropriate index mark thereon while viewing an image of the photographic scene. The arrangement further serves to remind the operator of the distance at which the lens is focused and should the setting be obviously in error, it will be obvious to the operator and a proper correction can be made before the camera's shutter is released.

The viewfinder is mounted upon an upper surface of the camera and is displaced a substantial distance from a variable focusing lens. The lens is incorporated within a lens bezel rotatably mounted to extend externally beyond a forward wall of the camera's housing as disclosed in U.S. Pat. No. 3,893,221 issued on Dec. 26, 1973 to Walter G. Lehman, for "Lens Assembly Mounting Method and Apparatus." The lens bezel includes, upon an outer peripheral surface, a distance scale for indicating to the operator a distance at which the lens is focused. A periscope-like system is mounted forward of the face of the camera and extends above the lens bezel within a housing provided therefor for directing an image of the distance scale into the viewfinder whereby the operator may observe the distance scale's image simultaneously with an image of the photographic scene during the focusing of the lens for a preselected, visually estimated distance.

However, the periscope-like system includes a plurality of reflectors having mirror surfaces which must be precisely positioned within the housing in order to direct the image of the scale in the direction of a specially adapted refracting portion provided therefor upon a lens of the viewfinder which substantially adds to the manufacturing cost of the camera. In addition thereto, the objective lens of the camera is threadably secured within the lens bezel and is adapted to remain externally beyond the forward face of the camera for external movement towards and away from the forward face during the focusing of the lens between the distant and nearmost foci. The lens bezel is rotated for rectilinear movement of the lens along its optical axis during the focusing of the lens between the distant and nearmost foci whereby the distance scale moves beneath the periscope-like system and remains within the field of view of the operator within the viewfinder during the focusing of the lens. While the periscope-like system may be adapted for use with most conventional cameras, it is more suitably adapted for use with cameras of the nonfolding type having an externally mounted lens wherein the externally mounted optical systems do not conflict with an design. Incorporating such an arrangement with a compact folding camera would substantially add to the overall length and thickness of the camera when the camera is collapsed, thereby defeating the purpose of the design.

By incorporating a compound lens system having at least one movable element adapted to move axially and rectilinearly between a distant and nearmost foci, within a shutter housing of the camera, a variable focusing, compact, folding camera may be developed having an overall thickness no greater than the thickness of the shutter housing when the camera is collapsed into the folded position.

The lens system developed therefor enables the movable lens to be rectilinearly displaced along the optical axis within the shutter housing whereby the hyperfocal positioning of the lens assembly is extended to include sharp focusing for a variety of camera-to-subject distances. U.S. Pat. No. 3,619,036 issued on Nov. 9, 1971, to James G. Baker, for "Compact Four Element Photographic Objective Lens" is typical of such systems and discloses a four element objective lens which employs front-element focusing. The front element moves rectilineraly within the shutter housing of the camera and even in its forwardmost position never extends beyond a forward wall of the shutter housing. Therefore, the periscope-like system in the aforementioned U.S. Pat. No. 3,583,300 and could not be adapted for use with such a lens assembly to provide the desired performance characteristics necessary for viewing the image of the scale within the viewfinder of such a camera.

In recent copending application, U.S. Pat. No. 3,971,052 issued on July 20, 1976, in the name of William T. Plummer, for "Compact Galilean Viewfinder," a photographic camera clearly resembling a compact, folding Polaroid SX-70 Land Camera, as made and sold by Polaroid Corporation, Cambridge, Massachusetts, was disclosed which enabled the manufacturer to substantially reduce the cost of the original version by simply substituting a viewing system for the through-the-lens viewing system of the original SX-70 camera and adding an external focusing scale upon a ring surrounding the lens. The focusing scale, however, is not visible to the operator within, beneath or beside the field of view of the viewfinder. In addition thereto, the characters comprising the scale are arranged about the peripheral edges of the ring which is relatively small for developing a distance scale and thereby severely restricts the size of the characters. Again, the operator is required to remove the camera from the viewing position to a position whereat the operator may adjust the scale and make the appropriate setting before the camera is raised to review the photographic scene. The previously cited Polaroid SX-70 Land camera may be modified for use with the viewing system as disclosed in the aforementioned U.S. Pat. No. 3,971,052. The camera includes a compound lens system mounted within a shutter housing having a movable element and manually rotatable focusing knob coupled thereto for focusing the lens assembly by advancing or retracting its movable element within the boundaries of the shutter housing. At least one element of the lens assembly is mounted within a lens bezel for rectilinear movement between distant and nearmost foci within a focusing barrel included within the forward wall of the shutter housing. The lens bezel includes indicia forming a distance scale arranged close to the peripheral edges of the lens assembly. The lens assembly is brought into focus for each visually estimated camera-to-subject distance by rotation of the focus wheel whereby the lens assembly is moved to align indicia representative of that distance with an index mark extending longitudinally upon an inner surface of the focus barrel. The viewing system is mounted upon the camera such that an uppermost surface of the shutter housing of the camera is visible within the field of view of the operator when the operator is viewing the photographic scene through the viewfinder. However, the focusing scale provided therewith, as with most internally housed lens assemblies, is not readily accessible to the operator from the rear of the camera. The concentration of the operator upon the scene may be disrupted when the operator is required to lower the camera from the viewing position and turn the camera to a position whereat the forward wall is facing the operator whereby the operator may view the movement of an appropriate character on the distance scale in alignment with the index mark.

In accordance with the present invention, it will be seen that a substantially simplified, inexpensive version of a focusing scale is provided which can be adaptably coupled to a focusing mechanism of such a camera and is positioned upon the camera in a convenient location whereby the operator is visibly reminded of the distance at which the lens is focused. The invention may be incorporated with a camera having a lens adjustably mounted for movement between a distant and nearmost foci within a shutter housing of the camera or mounted externally, i.e. beyond a forward face of the housing of the camera.

SUMMARY OF THE INVENTION

The instant invention relates to a photographic apparatus and, more particularly, to a unique distance indicating device for aiding an amateur photographer in focusing an objective lens of the photographic apparatus for a visually estimated preselected camera-to-subject distance. By coupling a relatively simple and inexpensive device to a focusing control system of the apparatus, the apparatus can be brought into coincidence with a desired camera-to-subject distance by the operator. The device operates to provide a means for indicating a distance at which a lens of the apparatus is focused and the operator may be substantially assured of establishing an optimum camera-to-subject distance for flash photography. In addition thereto, the device aids the photographer in sharply focusing the lens system at the predetermined camera-to-subject distance in relatively slow speed film applications where accurate focusing of the objective lens system is required for short distances.

The critical distance required either for deriving an optimum flash exposure or for the short range focusing may preferably be determined by the operator in a preferred embodiment while sighting through the viewfinder thereby allowing the operator to concentrate on the viewing of the photographic scene as all the information necessary for proper focusing of the lens assembly is presented within the field of view of the viewfinder. However, the ability to view the indicating means within the viewfinder is not a requisite for installing the device in an apparatus and depends solely upon the model of apparatus with which it is used. Because of the simplicity of the device, it is conceivable the device may be located upon the camera so that the operator need not have to remove the camera from the viewing position but merely shift his direction of sight from within the viewfinder to a surface having the indicating means displayed therein to be apprised of the distance at which the lens of the camera is focused. Where appropriate, the device may be incorporated with the apparatus of the variety having a simple focusing objective lens by coupling the device to a focusing control system of the apparatus during the production of the apparatus. For models currently in use, the device can be installed as an optional device with little difficulty. In either case, the device substantially aids the operator to overcome an absence of a rangefinder implement commonly employed with more expensive cameras and provides at least one function of a range finder at a nominal cost.

By installing the relatively simple device in the apparatus at a suitable location, the amateur photographer can be consistently apprised of a necessity for adjusting the lens to an appropriate camera-to-subject distance before releasing the shutter and exposing the film contained within the camera.

The device comprises an indica-bearing member, a drum or cylinder rotatably mounted upon a shaft for rotation, thereabout, and a means for coupling the device to the lens. The camera includes a focus control system for the lens whereby the lens is moved between a distant and nearmost focus. In a preferred embodiment, the device is installed within a shutter housing of the apparatus for direct coupling to the lens. The focusing control system includes a focus wheel coupled by an idler gear to the lens for synchronously moving the lens therewith rectilinearly along a locus of travel within the shutter housing in accordance with a predetermined camera-to-subject distance upon adjusting the radial orientation of the focus wheel. A representative example of such a focusing control arrangement may be found in U.S. Pat. No. 3,914,777, issued to Frederick Slavitter on Oct. 21, 1975.

The shutter housing includes a window suitably situated thereon for viewing identifying characters as they are moved into alignment with the window during the rotation of the focus wheel. Each identifying character displayed in the window defines the camera-to-subject distance for which the lens is focused thereby immediately and consistently reminding the operator to bring the lens assembly into coincidence with a predetermined camera-to-subject distance.

The indicia-bearing member is formed from a sheet of resilient material, e.g., plastic film or spring steel having the identifying characters included upon a side facing in the direction of the window. The identifying characters form a distance scale for each focused position of the lens assembly within the housing. The indicia-bearing member is treated and preformed to provide it with a form of memorization which is introduced into the material during the preforming process to be described hereinafter. The indicia-bearing member is formed having a coiled or rolled cylindrical configuration and is self-rewinding when in an unstressed condition subsequent to the processing thereof. That is to say, when the band is uncoiled or unrolled into a fully extended position, having both ends of a pair of opposing ends secured, the band will self-enfold by recoiling automatically into its original coiled configuration upon a release of one of the ends. Therefore, it can be said that the band is provided with a form of memorization which enables it to recoil upon itself without assistance from any other mechanical means such as a rewinding device or take-up spring.

The shutter housing includes therein mounting means providing structure including a pair of laterally spaced posts or fixed members. The indicia bearing member is supportably mounted upon one of the posts or fixed members while in the coiled cylindrical configuration and the drum is mounted for rotation upon a second one of the posts. A leading end of the indicia-bearing member is passed beneath the window with the indicia-bearing side thereof facing in the direction of the window for attachment to the drum. The second one of the posts is located upon the mounting surface such that the coupling means is in substantial engagement with the lens assembly when the drum is rotatably mounted thereon whereby the coupling means and the drum are rotated by the rectilinear movement of the lens assembly between the distant and nearmost foci within the shutter housing.

The indicia-bearing member is uncoiled upon the first post and wrapped about the peripheral surface of the drum as the focus wheel is rotated for moving the lens assembly from the distant to the nearmost focus. When the focus wheel is rotated in an opposite direction to move the lens assembly from the nearmost to the distant focus that portion of the indicia bearing member wrapped about the peripheral surface of the drum is releasably unwrapped and transferred to be taken up upon the first post as the band recoils upon itself thereon. The form of memorization included in the indicia bearing member further functions, through its one end attachment to the drum, to maintain tension in the band for substantially sustaining the necessary accuracy in the established relationship between the focused position of the lens assembly within the housing and the identifying character displayed at the window defining that distance at which the lens assembly is in focus to provide a sharp image of the photographic object at the focal plane of the camera.

In an alternative embodiment of the invention the indicia-bearing member is stored in a tube located upon the mounting structure in a position substantially the same as that previously reserved for the first post. The leading end of the band is threaded through a slot provided therefor in the tube for its attachment to the drum and for its subsequent operation as a distance scale in defining the focused position of the lens. The indicia-bearing member lies within the tube unattachably stored therein whereby the band is free to uncoil and recoil automatically as the lens assembly is moved between the distant and nearmost foci.

In still another embodiment, the device is installed within the shutter housing for direct coupling with the focus wheel whereby the coupling means of the device and the lens are synchronously driven by the manual rotation of the focus wheel. The direct coupling of the device to the focus wheel enables the focus wheel to adjust the position of the lens for sharp focusing of the image of the photographic subject at the focal plane of the camera and further enables the indicia-bearing band to align characters identifying the distance for which the lens assembly is sharply focused in the window of the shutter housing as hereinbefore described. In addition thereto, the direct coupling of the device to the focus wheel enables rolling surfaces other than gears to be employed without substantial loss in the transfer of motion of the focusing member to the device due to slippage in a camera employing means other than a focusing wheel for adjusting the position of the lens.

An object of the invention is to provide a relatively simple and inexpensive device which can be incorporated with an inexpensive compact photographic apparatus currently in use or during the production thereof for adding an operator of the apparatus in bringing a lens assembly of the apparatus into coincidence with a visually estimated or predetermined camera-to-subject distance by indicating to the operator the distance at which the lens is focused without adding to the size of the apparatus.

Another object of the invention is to provide a relatively simple and inexpensive device for use with a photographic apparatus having a direct coupling to a lens assembly and a focusing control system therefor whereby the device is synchronously moved therewith to present a character indicating the distance at which the lens assembly is focused at a viewing station of the apparatus.

A final object of the invention is to provide a relatively inexpensive device for a photographic camera which substantially overcomes the absence of a range-finding implement commonly employed with more expensive cameras by enabling an operator to concentrate on a photographic scene during the focusing of the lens for a predetermined camera-to-subject distance for the operator has within a field of view of the viewfinder all of the information for proper focusing of the lens and therefor is not required to look away from the photographic scene before releasing the shutter.

Other objects of the invention will in part be obvious and will in part appear hereinafter.

The invention accordingly comprises the apparatus possessing the construction, combination of elements and arrangement of parts which are exemplified in the following disclosure and the scope of the application which will be indicated in the claims.

BRIEF DESCRIPTION OF THE DRAWINGS

For a further understanding of the nature and objects of the invention, reference should be made to the following detailed description taken in connection with the accompanying drawings wherein;

FIG. 1 (a) is a view illustrating a view presented at a viewing end of a viewfinder to an operator of the camera shown in FIG. 1;

DETAILED DESCRIPTION OF THE INVENTION

Figure 1:
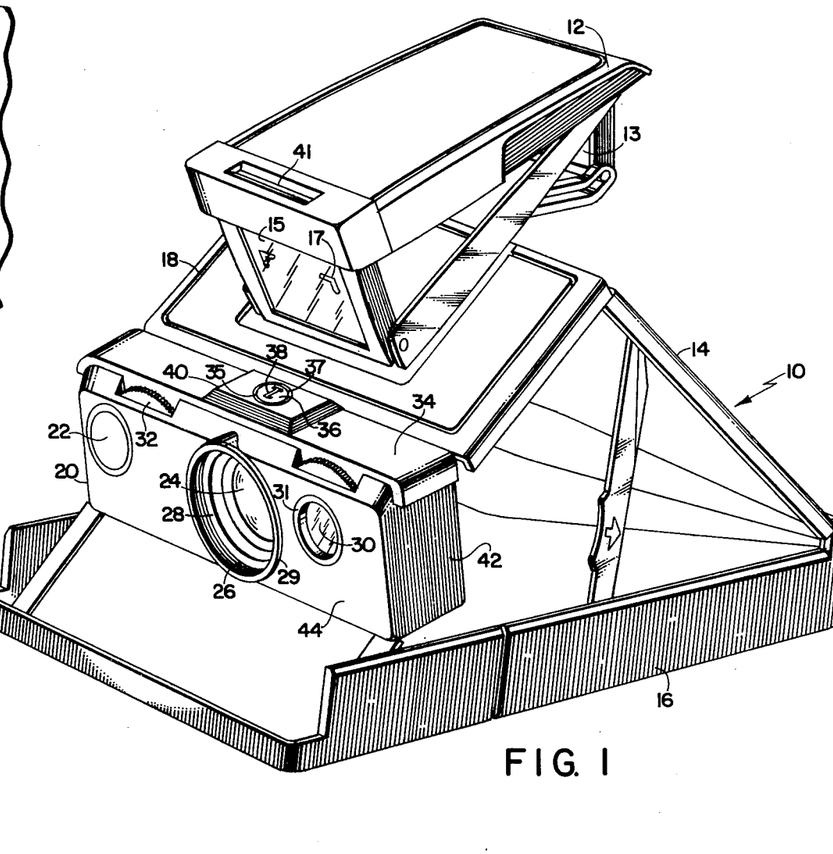
FIG. 1 is a perspective view of a photographic apparatus embodying the instant invention.

Referring in more detail by reference characters, FIG. 1 of the drawings wherein there is shown a preferred embodiment of the instant invention in the form of a folding camera 10 on top of which there is mounted a folding Galilean viewfinder 12 of the type disclosed and described in detail in the aforementioned U.S. Pat. No. 3,971,052. While the camera 10 may be of any conventional construction, as shown, it clearly resembles the compact, folding Polaroid SX-70 Land Camera Model 3, as made and sold by Polaroid Corporation of Cambridge, Massachusetts.

Camera 10 includes a plurality of housing sections generally designated 14, 16, 18 and 20. Extending upwardly in an erected position from housing section 18 is the Galilean viewfinder 12 through which a photographic scene to be photographed may be viewed.

Housing section 20 comprises a shutter housing including a shutter release button 22, a lens 24, a focusing barrel 26, a lens bezel 28, a decorative ring 29 for the focusing barrel 26, a photocell window 30 and a bezel 31 therefor through which a conventional photocell forming a part of any conventional exposure control system may be exposed to artificial or ambient illumination. A focus wheel 32 extending through a slot in the housing section 20 is employed to move at least one element of the lens 24 rectilinearly along a locus within the focusing barrel 26 between a distant and nearmost foci for sharp focusing of the lens 24 at the focal plane of the camera 10.

The shutter housing 20 includes a cover 34, an opposing pair of side walls 42 and a frontplate 44. The cover 34 includes a viewing station or window 36 having diametrically opposed edges 35 and 37 provided within a top surface thereof for viewing an identifying character 38 therein which defines the distance at which the lens 24 is focused within the housing section 20 to provide the sharply defined image of the photographic scene or object at the focal plane of the camera 10.

It will be noted that the window 36 is formed within a pedestal 40 previously reserved as a mounting pedestal including a socket for receiving a flash array for providing artificial illumination for flash exposures of photographs made with the Polaroid SX-70 Land Camera as disclosed in U.S. Pat. No. 3,820,128, issued on June 25, 1974 to John P. Burgarella et al for "Flash Photographic Control System." In a recent copending application, Ser. No. 569,749 filed Apr. 21, 1975 in the name of John A Lewis, Jr., for "Flash Mounting Means for Camera with Folding Viewfinder" there was disclosed a Galilean viewfinder including a flash socket upon a top surface of the viewfinder for receiving the flash array. By relocating the flash socket from the pedestal to the top of the viewfinder, the operator may mount the flash array out of the field of the viewfinder during flash exposures made with a modified version of the Polaroid SX-70 Camera incorporating such a viewfinder. Therefore, by substituting such a viewfinder for the through-the-lens viewfinder of the SX-70 Land Camera, essentially shown and described in U.S. Pat. No. 3,710,697 issued on Jan. 16, 1973, a simplied version of the SX-70 Land Camera may be realized which can be marketed at a substantially reduced price. An example of a modified version of the viewfinder is shown in FIG. 1 wherein the viewfinder 12 includes a lens system comprising an eye lens 13 and a forward lens 15, and a flash socket 41 mounted upon a top surface thereof for receiving the flash array.

The window 36 is provided within the cover 34 in the location vacated by the flash socket and being relocated upon the viewfinder 12 thereby positions the window 36 and the identifying characters 38 aligned thereat within or beneath the field of view of the operator when the operator is viewing the photographic scene within the viewfinder. In fact, the Polaroid SX-70 Land Camera may be modified for use with the instant invention by simply installing the instant invention in the shutter housing 20 and substituting a suitably modified version of a viewfinder of the type disclosed in the aforementioned U.S. Pat. No. 3,971,052 for the through the lens viewing system of that camera. Suitable modifications of the viewfinder would consist of adapting a portion of the lens system of the viewfinder 12 to bring the identifying character 38 legibly into focus within the viewfinder due to the close proximity of the character 38 to the forward lens 15.

Figure 1A:
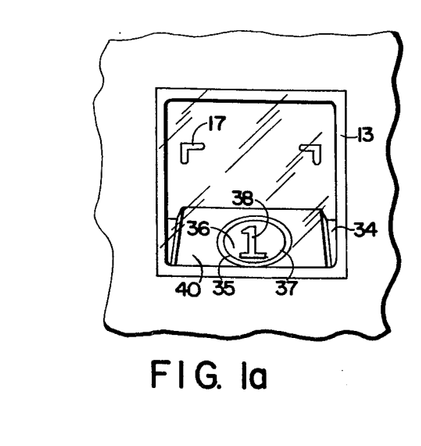

A typical view of the window 36 having the identifying character 38 aligned thereat as it is presented to the operator in the eye lens 13 of the modified viewfinder 12 is shown in FIG. 1(a). A pair of laterally spaced framing marks 17 formed upon a surface of the forward lens 15 are particularly useful as an aid to the operator in framing very close photographic objects therebetween.

Figure 2:
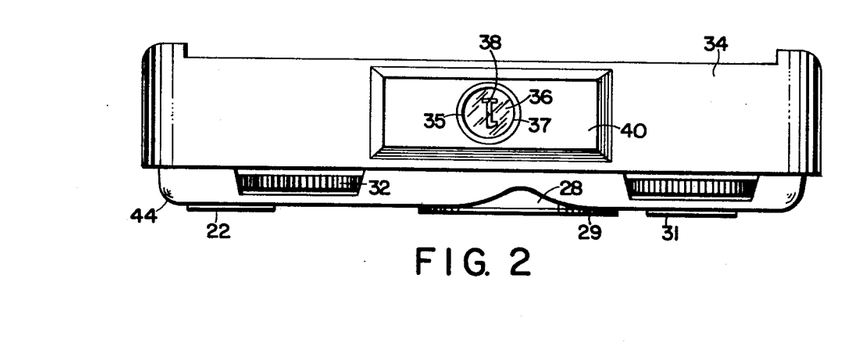
FIG. 2 is a top view of a housing of the photographic apparatus shown in FIG. 1 detached from the apparatus having the present invention included in uppermost surface thereof.
Figure 3:
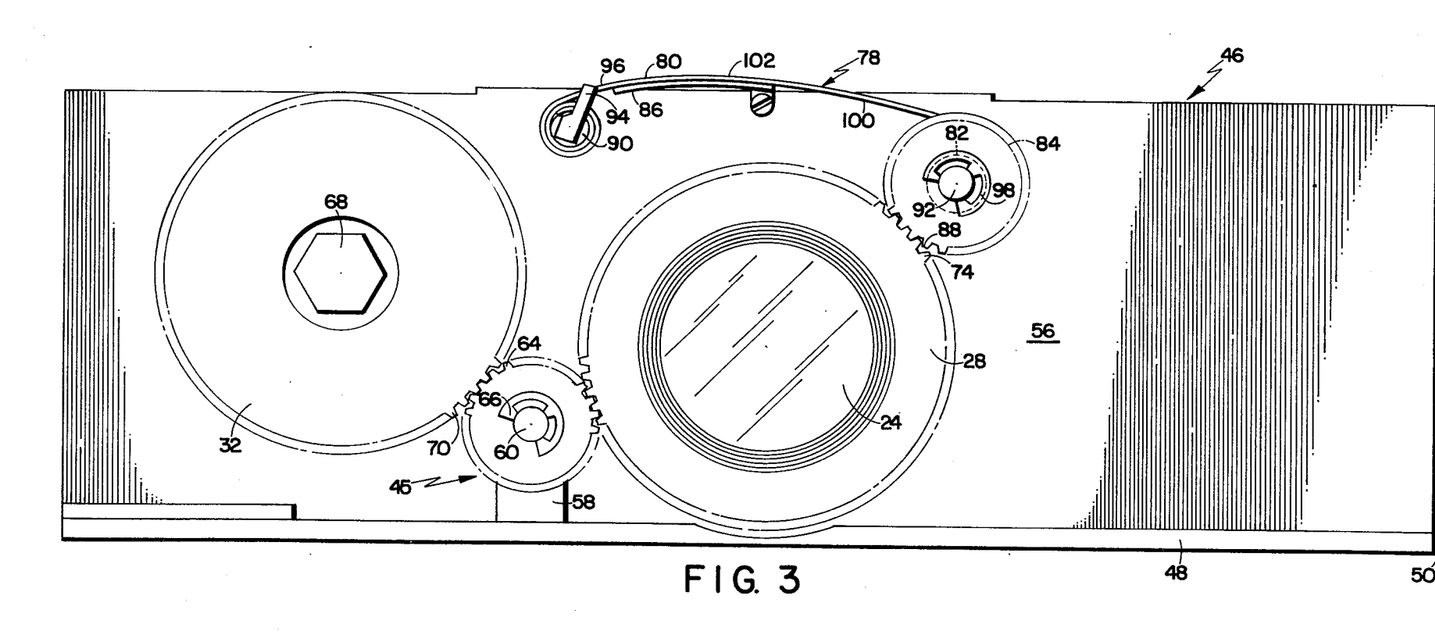
FIG. 3 is a front elevational view of the housing of FIG. 2 shown with a cover removed and parts omitted for clarity in accordance with the instant invention.
Figure 4:
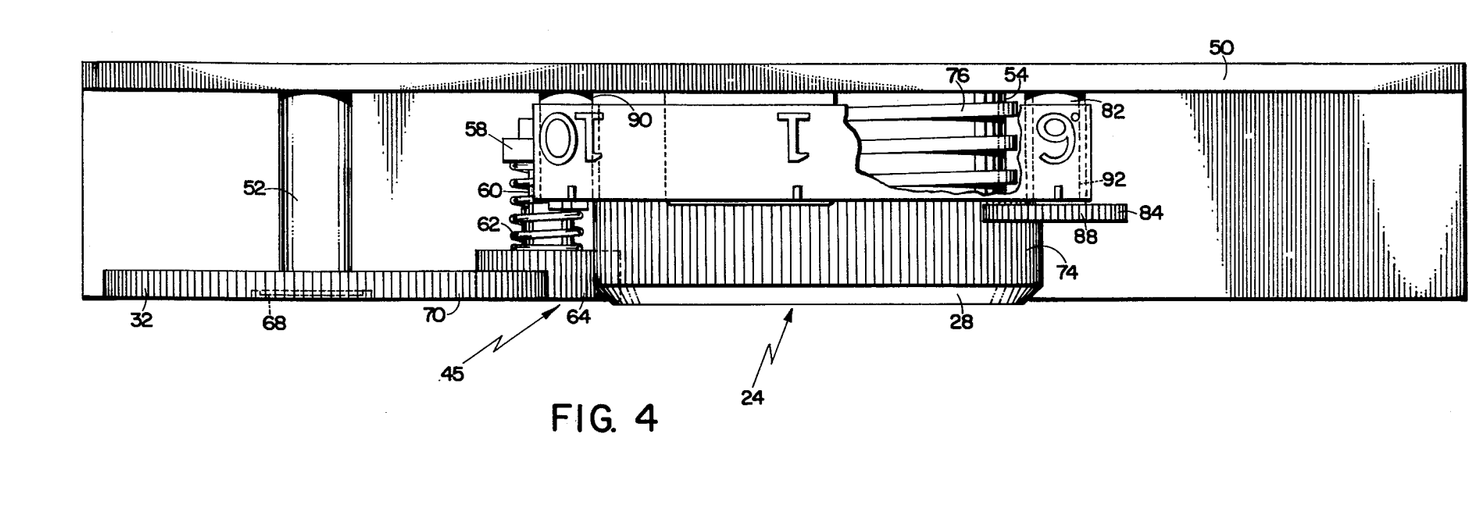
FIG. 4 is a top view of the embodiment shown in FIG. 3.

Reference is now made to FIGS. 2, 3, and 4 of the drawings wherein the shutter housing 20 is shown with the top cover 34, the opposing pair of side walls 42 and the front plate 44 removed. It is to be understood that other working parts such as an automatic exposure control system utilizing a light sensitive network providing for automatically programmed weighing and varying of aperature and controlling exposure intervals for a range of scenes most commonly encountered in conventional photographic practice have been omitted for clarity and only those components necessary for describing the operation of the instant invention have been included.

A focusing control system comprising the focus wheel 32 and the lens 24 are coupled together by a coupling apparatus 45 whereby the lens 24 is synchronously moved by rotation of the focus wheel 32 for objective lens focusing through its rectilinear movement along a locus of travel between a distant and nearmost foci.

The focusing control system is mounted for rotational movement upon a means for mounting the device 78 thereon comprising a mounting bracket 46 having a base 48 which may be integrally joined to an upright wall 50. The upright wall 50 integrally includes a pair of laterally spaced support members 52 and 54 which extend from an inwardly facing side 56 thereof above and substantially parallel with uppermost surface of the base 48 for rotatably supporting the focus wheel 32 and the lens 24 respectively thereon.

The coupling apparatus 45 comprises a mounting pedestal 58, a shaft 60, a compression spring 62 and an idler gear 64. The mounting pedestal 58 is secured to the base 48 and has one end of the shaft 60 fixedly secured to the pedestal 58. The compression spring 62 is slidably inserted over a free end of the shaft 60 prior to the coupling of the idler gear 64 thereto. The idler gear 64 is adapted to be manually moved longitudinally along the axis of the shaft 60 against the bias of the compression spring 62 for uncoupling the focus wheel 32 and the lens 24 during the calibration of the focusing control system as described in detail in the aforementioned U.S. Pat. No. 3,914,777. The compression spring 62 acts to bias and thereby sustain the idler gear 64 in a coupled relationship with the focus wheel 32 and the lens 24. The shaft 60 includes a cylindrical groove (not shown) for receiving an expandable ring 66 for securing the idler gear 64 upon the shaft 60 thereby preventing the idler gear 64 from escaping from the shaft 60 under the influence of the bias of the compression spring 62.

The manually rotatable focus wheel 32 is secured to the support member 52 by a pivot screw 68 extending through the focus wheel 32 to be threadably connected by suitable means to the support member 52. The focus wheel 32 is formed having a plurality of peripherally disposed gear teeth 70 for enmeshment with the idler gear 64 whereby the idler gear 64 is rotatably driven by the rotation of the focus wheel 32.

At least one element of the lens 24 is mounted within the cylindrical bezel 28 having a plurality of gear teeth 74 circumferentially disposed thereon extending longitudinally across a peripheral surface of the bezel 28 for enmeshment with the idler gear 64 of the coupling apparatus 45 whereby the lens 24 is in positive drive contact with the coupling apparatus 45 for movement along a locus of travel to provide objective focusing of the lens 24. The locus of travel of the lens 24 is defined by helical screw threads 76 circumferentially disposed upon the peripheral surfaces of the support member 54 whereby the lens 24 is axially displaced through the helical screw threads 76 rectilinearly and longitudinally along the support member 54.

Stated another way, the focus wheel 32 is rotatably mounted about a first axis spaced from and parallel with a second axis of the rotatably mounted lens 24 and coupled to the lens 24 by the coupling apparatus 45 rotatably mounted about a third axis spaced from and parallel with the first and second axis. The lens 24, the focus wheel 32 and the idler gear 64 are disposed upon the mounting bracket 46 such that they are in alignment and in enmeshment for rotational movement in a plane substantially perpendicular to their respective axes. Therefore, when the focus wheel 32 is manually rotated, the idler gear 64 in positive drive contact therewith rotates, and the lens 24 also in positive drive contact with the idler gear 64 is synchronously moved rectilinearly along the locus of travel defined by the helix screw threads 76 between the distant and nearmost foci to obtain the sharply defined image at the focal plane of the camera 10 whereby the camera 10 is brought into coincidence with the predetermined camera-to-subject distance. An aid for assisting an operator of the camera to know the distance at which the lens 24 is focused for a predetermined or preselected camera-to-subject distance is shown generally as a device 78 in FIGS. 3 and 4.

The device 78 as a means for indicating at the window 36 a distance at which the lens is focused comprises an indicia-bearing member 80, means for biasing the indicia-bearing member in the direction of the window or supporting platform 86 and means for guiding the indicia-bearing member 94, a drum 82, and a second idler gear 84 or means for coupling the device 78 to the focusing control system. The second idler gear 84 is rotatably mounted about a fourth axis spaced from and parallel with the first, second and third axes.

The device 78 is mounted upon the inwardly facing side 56 of the upright wall 50 adjacent to the opposing diametrical edges 35 and 37 of the window 36 provided therefor in the cover 34 and is made active by the manual rotation of the focus wheel 32 to disclose the distance at which the lens 24 is sharply focused to the operator in the window 36.

The indicia-bearing member 80 is formed as a generally rectangular sheet of opaque, resilient material, e.g., plastic film or spring steel, having a width substantially equal to the length of the drum 82. The indicia-bearing member 80 is preferably preformed by wrapping the material around a rod and placing the rod in an oven for heat treating the plastic film material at approximately 200° F for a predetermined period whereby the material takes on the configuration of the rod and is thereby provided with a form of memorization which operates to maintain the material in a normal coiled cylindrical configuration when the material is removed from the oven for cooling. Subsequent to the cooling period, the material retains the coiled configuration having the form of memorization and permits the indicia-bearing member 80 to automatically and unassistedly self-enfold or recoil back into the cylindrical configuration each time the material is uncoiled or unrolled. It should be noted that an alternative method employed for preforming the indicia-bearing member during the heat treating process and thereby — provide it with the form of memorization is to roll the material into a cylinder and store the material in a tube during the heat-treating process whereby the material will take on the configuration of the tube subsequent to the cooling period.

The second idler gear 84 is secured by suitable means to one end of the drum 82 to provide a unitary rotatable member. The gear 84 includes a plurality of peripherially disposed gear teeth 88 for enmeshment with the lens 24 through positive drive contact with the circumferentially disposed gear teeth 74 disposed on the cylindrical lens bezel 28 of the lens 24.

The mounting bracket 46 includes a pair of laterally spaced first and second mounting posts or fixed members 90 and 92 respectively for mounting the indicia-bearing member 80 and drum 82 having the idler gear 84 secured thereto upon the upright wall 50. The mounting posts 90 and 92 are included upon the inwardly facing side 56 of the upright wall 50 and extend therefrom parallel with an upper surface of the base 48.

The indicia-bearing member 80 is mounted upon the first mounting post 90 in the coiled configuration by sliding the coil over an unattached end of the post 90 into a hollow in the coil created by the removal of the rod used during the heat-treating process. The guide means 94 is attached by suitable means to an unattached end of the post 90 subsequent to the mounting of the indicia-bearing member 80 thereon to urge the indicia-bearing member 80, as it moved between the normal coiled and uncoiled positions, in the direction of the window 36 through its contact with an edge 96 of the indicia-bearing member 80.

The drum 82 and the second idler gear 84 are mounted upon the second post 92 to be rotatably driven by the lens 24 as it moves along its locus of travel between the distant and nearmost foci. The post 92 is located upon the inwardly facing side 56 such that the teeth 88 of the idler gear 84 mesh with the teeth 74 of the lens bezel 72 whereby the idler gear 84 is rotatably driven by the movement of the lens 24 in a plane substantially perpendicular to the longitudinal axis of the post 92. The idler gear 84 is retained in its location upon the post 92 by an expandable ring 98 secured to an unattached end of the post 92 for retaining the idler gear 84 in position for positive drive contact with teeth 72 on the lens bezel 28.

A leading end of the indicia-bearing member 80 is uncoiled and attached to the drum 82 which operates as a take-up member for the indicia-bearing member 80 as the indicia-bearing member 80 is uncoiled by the rotation of the drum 82 when the second idler gear 84 is driven in a clockwise direction by the lens 24 as viewed in FIG. 3. As the drum 82 rotates, the indicia-bearing member uncoils about the first post 90 and wraps about the peripheral surfaces of the drum 82 thereby placing the indicia-bearing member 80 in a substantially constant stress position created and sustained in the indicia-bearing member 80 through the tension provided by the form of memorization included in the indicia-bearing member 80 which is constantly acting to recoil that portion of the indicia-bearing member 80 wrapped about the drum 82 upon the first mounting post 90.

The supporting platform 86 is attached to the upright wall 50 of the mounting bracket 46 for engaging an underlying nonindicia-bearing side 100 of the indicia-bearing member 80 whereby an indicia-bearing side 102 thereof is biased in the direction of the window 36 beneath the opposing edges 35 and 37. The supporting platform 86 acts to bias the indicia-bearing member 80 in the direction of the window 36 and further prevents the member 80 from extending downwardly within the housing section 20 as it is uncoiled about mounting post 90. The supporting platform 86 is necessary despite the tension in the indicia-bearing member 80 provided by the form of memorization as it is necessary for mounting post 92 to be displaced vertically below mounting post 90 upon the upright wall 50 to enable the idler gear 84 to be in position for enmeshment with the teeth 74 included upon the lens bezel 28 for positive drive contact therewith. Mounting post 90 must be located close to the top surface of the upright wall 50 to position the identifying characters 38 close to the window 36 whereby the characters 38 shall be visible to the operator in the window 36 of the housing section 20. Therefore, the supporting platform 86 is used to offset the straight line travel of the indicia-bearing member 80 as it uncoils and recoils upon the mounting post 90.

The indicia-bearing side 102 of the indicia-bearing member 80 includes the identifying characters 38 shown in the window 36 of the housing section 20 in FIGS. 1 and 2. The identifying characters 38 are disposed upon the indicia-bearing side 102 of the indicia-bearing member 80 to form a scale the measurements of which are graduated so as to communicate to the operator through the window 36 of the cover 34 the distance at which the lens 24 is focused. When the device 78 is employed with a viewfinder, of the type disclosed and defined in the aforementioned U.S. Pat. No. 3,971,052 and further shown in FIG. 1 as the viewfinder 12, the character 38 in alignment at the window 36 of the cover 34 may be viewed in a lower portion of that viewfinder 12 (as shown in FIG. 1(a) while the operator is viewing the scene to be photographed therein. Therefore, the operator is able to concentrate on the photographic scene because the viewfinder contains all the information necessary for correct focusing of the lens 24 for the predetermined camera-to-subject distance. Furthermore, the operator is not required to look away from the photographic scene before releasing the shutter of the photographic apparatus.

The device 78 upon being coupled by the idler gear 84 to the focus control system may be simultaneously calibrated therewith to bring the identifying characters 38 presented at the window into coincidence with the distance at which the lens 24 is focused. For example, during the calibration, the idler gear 64 of the coupling apparatus 45 may be depressibly moved longitudinally along its axis upon the shaft 60 by applying pressure against the idler gear 64 whereby the focus wheel 32 is uncoupled from the coupling apparatus 45. Once the focus wheel 32 has been uncoupled from the coupling apparatus 45, the focus wheel 32 and the lens 24 having the device 78 coupled thereto may be independently calibrated for any preselected distance so as to bring the rotational orientation of the focus wheel 32 into coincidence with the linear focal position of the lens 24 and the device 78. Therefore, each component of the focusing control system can be independently calibrated for any preselected distance and an appropriate character 38 indicating the preselected distance at which the lens 24 is focused aligned at the window 36. Thereafter, when the lens 24 is focused for any predetermined or visually estimated camera-to-subject distance by manually rotating the focus wheel 32 the identifying character 38 corresponding to that distance is presented at the window 36 of the cover 34. For example, in FIG. 2, the identifying character "1" indicates the lens 24 is located in a forward position within the focusing barrel 26 (as viewed in FIG. 4) for focusing the sharply defined image of the photographic object at the focal plane of the camera for a camera-to-subject distance of a single measurement of distance, e.g., 1 foot, 1 meter, etc.

Prior to initiating exposure of a film unit (not shown) positioned within the camera 10 by depressing the shutter release button 22, the operator determines by a visual estimate or a physical measurement the distance at which the photographic object is located from the camera 10. Upon establishing that predetermined distance, the operator by rotating the focus wheel may adjust the lens 24 to a position within the focusing barrel 26 of the housing section 20 at which the lens 24 defines a sharply defined image of the photographic subject at the focal plane of the camera 10. The second idler gear 84 is driven by the rectilinear movement of the lens 24 to a position whereby the predetermined camera-to-subject distance represented by an appropriate character indicating the lens 24 is aligned at the window 36 of the housing section 20.

In FIGS. 3 and 4, the lens 24 is moved from a nearmost focus to a distant focus by the manual rotation of the focus wheel 32 in a clockwise direction and the lens 24 is synchronously rotated thereby in a clockwise direction for its rectilinear movement along its locus of travel rearwardly within the focusing barrel 26 in the direction of the upright wall 50. The second idler gear 84 and the drum 82 are driven by the rotation of the lens 24 in a counterlockwise direction whereby an appropriate portion of the indicia-bearing member 80 is released from the peripherial surfaces of the drum 82 and recoiled upon post 90 by the form of memorization of the indicia-bearing member 80 acting synchronously with the rotation of the drum 82 to recoil the released material automatically about the post 90 without any further assistance. As the member recoils upon the post 90, numerically ascending characters relating to the changing locations of the lens 24 as it moves from the nearmost to the distance focus are presented at that window 36. When the character 38, indicating that the lens 24 is properly positioned within the focusing barrel 26 to define the sharply defined image of the photographic object for the predetermined distance is presented at the window 36 the operator is apprised that the lens 24 is sharply focused for that predetermined distance.

For movement of the lens 24 from the distant focus to the nearmost focus, the focus wheel 32 is manually rotated in a counterclockwise direction whereby the lens 24 is also driven in a counterclockwise direction for rectilinear movement of the lens 24 forward within the focusing barrel 26. The second idler gear 84 and the drum 82 are driven by the rotation of the lens 24 in a clockwise direction (as viewed in FIGS. 3 and 4) and the rotation of the drum 82 pulls the indicia-bearing member 80 in the direction of the drum 82 whereby the indicia-bearing member 80 partially uncoils and the uncoiled portion is taken up or wound about the peripheral surfaces of the drum 82 during which numerically descending characters indicating the changing positions of the lens 24 as it moves from the distant focus to the nearmost focus are presented in the window 36 of the cover 34.

It should be noted that the device 78 enables the distance scale included upon the indicia-bearing side 102 of the indicia-bearing member 80 to be substantially expanded by simply substituting a smaller diameter gear for gear 84 and reducing the size of the drum 82 whereby the ratio between the gear 84 and the lens assembly 24 is changed to increase the space between adjacent characters making it possible for larger characters to be used for improved readability.

Figure 5:
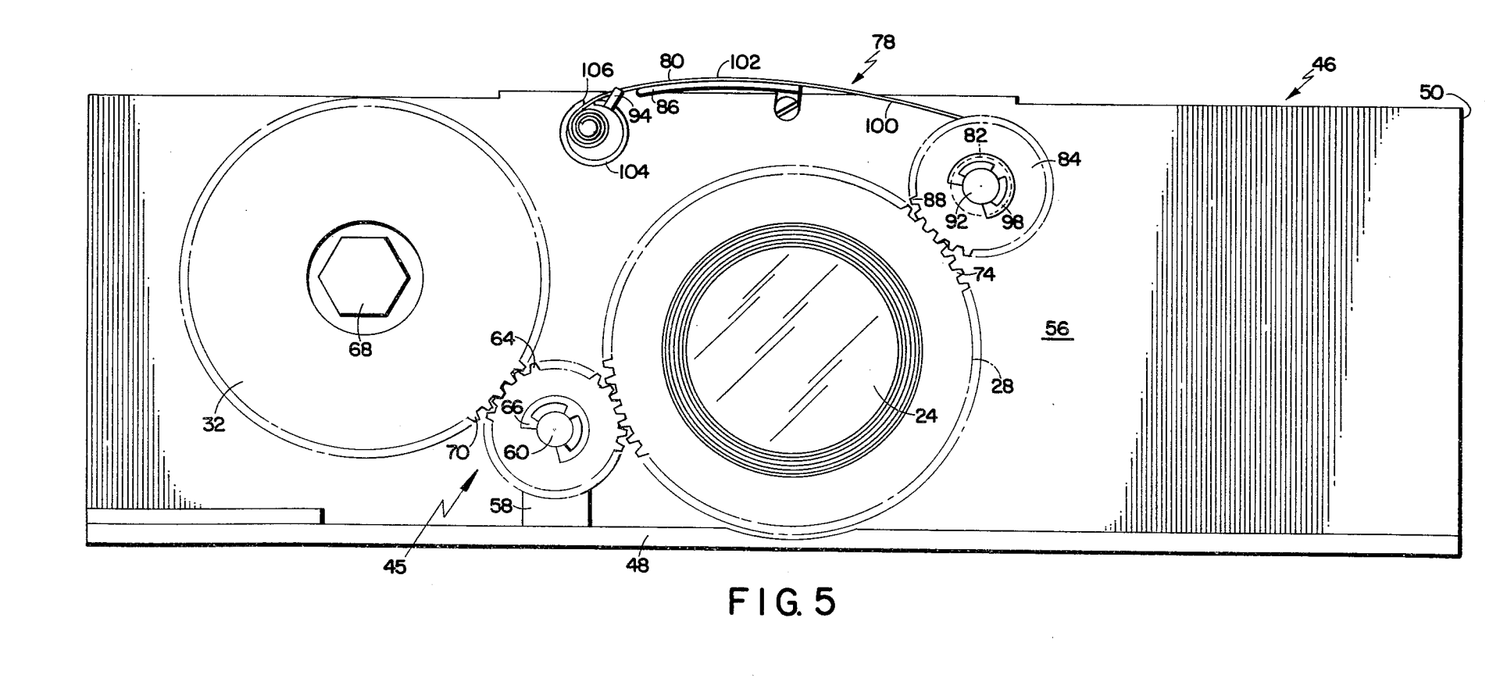
FIG. 5 is a front elevational view of an alternative embodiment of the instant invention.

Reference is now made to FIG. 5 of the drawings wherein there is shown an alternative embodiment of the instant invention. In this embodiment, the indicia-bearing member 80 is stored in the coiled configuration within a tube 104 secured upon the inwardly facing side 56 of the upright wall 50. The tube 104 extends forwardly in a direction away from the inwardly facing side 56 above and parallel with the base 48 of the mounting bracket 46 and includes a slot 106 extending longitudinally within the tube for threading one end of the indicia-bearing member 80 therethrough for suitable attachment of the indicia-bearing member 80 to the drum 82. The slot 106 further enables the indicia-bearing member 80 to pass therethrough as portions of the member 80 are transferred to the drum 82 during the uncoiling procedure and to be received in the tube 104 during the recoiling procedure. The guide 94 is attached by suitable means to the tube 104 or may be integrally included thereon for directing the indicia-bearing member 80 in the direction of the window 36 as previously described.

It is to be noted that it is the form of memorization provided for in the indicia-bearing member 80 which enables the indicia-bearing member 80 to be unattachably stored within the tube 104 wherein the indicia-bearing member 80 is free to automatically recoil or self-enfold upon itself automatically as the lens 24 is moved by the manual rotation of the focus wheel 32 from the nearmost to the distant focus. upon itself automatically as the lens 24 is moved by the manual rotation of the focus wheel 32 from the nearmost to the distant focus.

Figure 6:
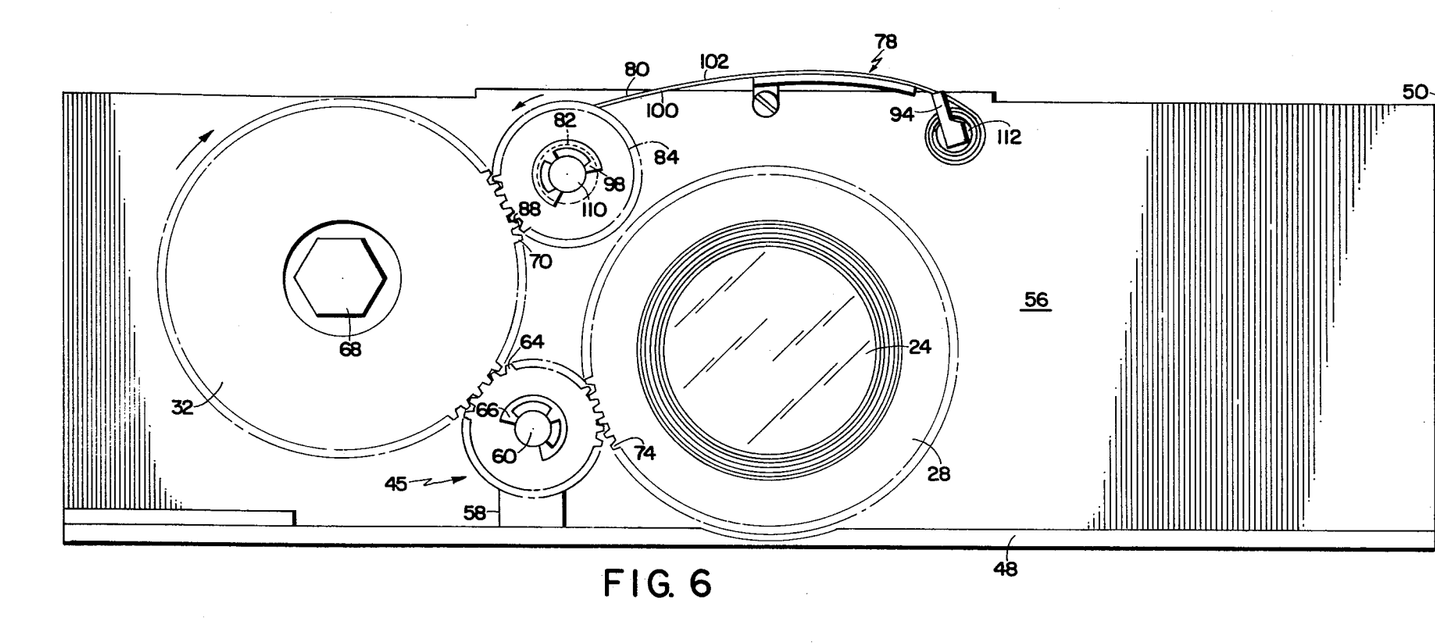
FIG. 6 is a front elevational view of still another embodiment of the instant invention.

Reference is now made to FIG. 6 of the drawings wherein there is shown another embodiment of the instant invention. In this embodiment, the second idler gear 84 and the drum 82 are mounted for rotation upon a mounting post 110 such that the second idler gear 84 is in position for positive drive contact with the focus wheel 32. The indicia-bearing member 80 is mounted in the coiled configuration upon a post or fixed member 112 in the vicinity of the previously mentioned post 92. A leading end of the indicia-bearing member 80 is attached to the drum 82 whereby the indicia-bearing member 80 is partially uncoiled and recoiled to be taken-up and released respectively upon the peripheral surfaces of the drum 82 as the focus wheel 32 is rotated and the lens 24 is rectilinearly moved between the distant and nearmost foci within the housing section 20 to a position therein at which the lens 24 is sharply focused at the focal plane for a predetermined camera-to-subject distance. It is to be noted that a reversal in the mounting positions of the second idler gear 84 including the drum 82, and the indicia-bearing member 80 upon posts 110 and 112, respectively, may be conducted without substantially altering any of the components of the device 78 as the relative direction of rotation of the focus wheel 32 and the second idler gear 84 remain the same at that hereinbefore described for operation in the preferred embodiment. Therefore, the direction in which the indicia-bearing member 80 moves for transferring portions of the indicia-bearing member 80 between the laterally spaced posts 110 and 112 for presenting an appropriate identifying character 38 at the window 36 and indicating the distance at which the lens 24 is sharply focused, remains substantially the same. That is to say, the only difference between the embodiment disclosed in FIG. 6 and the preferred embodiment lies in the fact that the indicia-bearing member 80 will recoil automatically as the lens means 24 is moved by the rotation of the focus wheel 32 from a distant focus to a nearmost focus and uncoil as the lens means 24 is moved from the nearmost focus to the distant focus whereas the reverse is true in the performance of the indicia-bearing member 80 in the preferred embodiment.

It will be apparent to those versed in the photographic art that in all embodiments of the instant invention, a unique means is provided for aiding an amateur photographer in determining the distance at which the lens 24 of the camera 10 is focused.

In each of the embodiments the instant invention enables the operator to concentrate on the photographic scene during the focusing of the lens 24 for a predetermined camera-to-subject distance for the operator has within his field of view all the information for proper focusing of the lens 24 and is not required to look away from the photographic scene before releasing the shutter. The instant invention may be coupled to the focusing system of a new camera during the production thereof or coupled thereto in an appropriate model currently in use as an improvement thereof and is particularly adapted for use in a compact, folding type camera as the device does not increase the overall dimension of such a camera.

It is apparent that by installing the simple, relatively inexpensive device of the instant invention into a camera, an amateur photographer will be constantly apprised of the necessity for focusing the lens at an optimum camera-to-subject distance for flash photography. Inasmuch as the manufacturer of the camera generally selects an appropriate distance therefor, such flash exposures taken with a camera having the device installed will always be taken at an optimum distance by rotating the focus wheel until the identifying character corresponding to the suggested appropriate distance for flash is aligned in the window of the housing section thereby assuring that the lens assembly is properly focused to provide relatively improved reliability in flash photography.

In the ambient mode of operation, the device of the instant invention greatly enhances the opportunity for the amateur photographer to obtain sharply focused results with an inexpensive camera, particularly in the case where the camera is designed for use with slower speed films or design conditions requiring settings where only a limited depth of field is available. By accurately measuring or by visually estimating the camera-to-subject distance with substantial precision, the amateur photographer may manually adjust the lens assembly to a position corresponding to the camera-to-subject distance by simply rotating the focus wheel whereby an identifying character corresponding to the measured or estimated distance is aligned in the window of the housing section thereby assuring sharply focused results may be achieved within a scope of the ability of the operator to accurately measure the distance from camera-to-subject.

The device is located on the shutter housing section of the camera at a location at which the image of the identifying character, aligned at the window of the shutter housing section, may lie within the field of view of the viewfinder whereby the operator may view the scene to be photographed and simultaneously focus the lens assembly to define a sharply defined image of the photographic subject at the focal plane of the camera for the predetermined camera-to-subject distance. Such an arrangement further serves as a reminder to the operator of the distance at which the lens assembly is focused. If the setting is obviously in error, it will be obvious to the operator and the proper correction may be made before the camera's shutter is released.

However, it will be apparent to those versed in the photographic art that the device may assume a variety of positions other than its present position upon the camera to cooperate with viewfinder of another type whereby an image of the scale may be visible in or beside the field of view thereof depending upon the model of camera with which it is used without departing from the inventive concept. Such an arrangement could also serve as a reminder to the operator of the distance at which the lens is focused.

While the device is described in the embodiments as a means for indicating to the operator the distance at which the lens is focused, it should be apparent to those skilled in the art that the device may be employed as an indicator for other settings used in the operation of a camera such as a manually operated exposure control setting whereby the device would indicate to the operator the size of the diaphragm opening.

The invention may be practiced or embodied in still other ways without departing from the spirit and essential character thereof. The preferred embodiment described herein is therefore to be considered illustrative and not restrictive, the scope of the invention being indicated by the appended claims and all variations which come within the meaning of the claims are intended to be embraced therein.

What is claimed is:

1. A variable focusing photographic apparatus comprising:
    a housing;
    a lens assembly mounted substantially within said housing;
    focusing means coupled to said lens assembly for moving said lens assembly between distant and nearmost foci so as to focus an image of a subject at a focal plane within said housing;
    a viewing station formed within a surface of said housing;
    an indicia-bearing strip of resilient material having a normally coiled unstressed configuration and first and second opposed ends; and
    means for supporting said strip for movement across said viewing station, said supporting means including a rotatable member driveable coupled to said lens assembly or said focusing means, means for fixedly attaching said first end of said strip to said rotatable member and a fixed member around which said second end of said strip is unattachably coiled whereby said strip is coiled about said rotatable member and partially uncoiled from said fixed member when said focusing means is driven in a first direction, and said strip is automatically recoiled around said fixed member and partially uncoiled from said rotatable member when said focusing means is driven in a second direction opposite to said first direction.

2. Photographic apparatus as defined in claim 1 wherein said fixed member about which said second end of said strip is unattachably coiled comprises a mounting post.

3. Photographic apparatus as defined in claim 1 wherein said fixed member about which said second end of said strip is unattachably coiled comprises a holder having a slit therein through which said strip passes.

4. A variable focusing photographic apparatus comprising:
    a body having a housing section attached thereto;
    lens means mounted within said housing section for variable focusing of a sharply defined image of a photographic object stationed a pedetermined distance therefrom at a focal plane within said body;
    means, mounted for rotation within said housing section, for varying the focus of said lens means coupled thereto for synchronous movement of said lens means between a distant and nearmost foci within said housing section;
    a viewing station formed within a surface of said housing section;
    means for indicating at said viewing station a distance at which said lens means is focused, said indicating means including an indicia-bearing member having a generally coiled configuration coupled with said lens means or said varying means within said housing section for synchronous movement with said lens means or said varying means to present an identifying character at said viewing station which correlates the sharply focused position of said lens means with the predetermined distance of the photographic object; and
    a viewfinder mounted upon said body having an optical path defining a field of view wherein an image of the photographic object and said indentifying characters presented at said viewing station are visibly contained therein.

5. Photographic apparatus as defined in claim 4 wherein said varying means and said lens means comprise a plurality of rotatable members each having means for positive drive contact peripherally disposed upon outer surfaces thereof whereby said lens means and said varying means are drivably coupled for synchronous movement.

6. A variable focusing photographic apparatus comprising:
    a body having a housing section attached thereto;
    lens means having means for positive drive contact disposed thereon mounted within said housing section for variable focusing of a sharply defined image of a photographic object stationed a predetermined distance therefrom at a focal plane within said body;

means for varying the focus of said lens means between a distant and nearmost foci adapted for positive drive contact with said lens means whereby said lens means is synchronously moved between a distant and nearmost foci within said housing section;

a viewing station formed within a surface of said housing section;

means for indicating at said viewing station a distance at which said lens means is focused;

said indicating means mounted within said housing section adjacent to said viewing station including an indicia bearing member having a graduated scale of identifying characters which serve to correlate the sharply focused position of the lens means with the predetermined distance of the photographic object and a cylinder attached to a first end of said indicia bearing member having means thereon for coupling said cylinder to one of said positive drive means and a fixed member around which a second end of said indicia-bearing member is unattachably coiled;

said cylinder and said coupling means respectively mounted to be rotatably driven in a first direction and a second direction opposite to said first direction in response to said synchronous movement of said varying means and said lens means whereby said identifying characters are sequentially presented at said viewing station as said lens means is moved to focus a sharp image of the photographic object; and a viewfinder mounted upon said body having an optical path defining a field of view wherein an image of the photographic object and said identifying characters presented at said viewing station are visibly contained therein.

7. Photographic apparatus as defined in claim 6, wherein said indicia-bearing member comprises a sheet of resilient material formed to assume a coiled configuration having a form of memorization whereby said indicia-bearing member is retained in said coiled configuration when said indicia-bearing member is unattachable coiled around said fixed member within said housing section adjacent to said viewing station, said indicia-bearing member being mounted in position to be uncoiled and thereby partially extended across said viewing station for attachment to said cylinder whereby said indicia-bearing member is uncoiled by the rotation of said cylinder in said first direction and automatically returns to the coiled configuration around said fixed member when said cylinder is driven by said coupling means in said second direction for sequentially changing said indentifying characters at said viewing station as said lens means is moved within said housing section to focus a sharp image of the photographic object for the predetermined distance.

8. Photographic apparatus including a compact, folding, variable focusing camera having a plurality of housing sections including a first and second housing section and a viewfinder coupled for relative movement between folded and extended positions with the viewfinder being mounted upon said first housing section having a field of view wherein a surface of said second housing section is visibly contained within said viewfinder when said camera is in said extended position, comprising in combination:

a lens mounted substantially within said second housing section for rectilinear movement therein between a distant and nearmost foci for presenting a sharply defined image of a photographic subject at a focal plane within said camera;

means for varying the focus of said lens including a rotatable member mounted within said second housing and drivably coupled to said lens for moving said lens synchronously therewith between said distant and nearmost foci;

a viewing station formed within said uppermost surface of said second housing; and means for indicating at said viewing station the distance at which said lens is focused, said indicating means including an indicia-bearing member drivably coupled to said lens or said varying means within said second housing section adapted to be synchronously moved across said viewing station by said lens or said varying means for presenting an identifying character at said viewing station which correlates the focused position of said lens with a predetermined distance of the photographic subject from the camera.

9. The combination as defined in claim 8 wherein said indicia-bearing member comprises a sheet of resilient material mounted adjacent said viewing station for movement across said viewing station and presenting therein the identifying characters in descending magnitude as said sheet is uncoiled by the movement of said lens means from said distant to said nearmost foci and automatically recoils to change the identifying characters in ascending magnitude at said viewing station as said lens means is moved from said nearmost to said distant foci.

10. A device mounted within an exposure control housing adapted to be coupled with a focusing control system of a photographic camera whereby an operator is apprised of a distance at which an objective lens of the photographic camera is sharply focused, comprising:

focusing means rotatably mounted about a first axis for movement to a position corresponding to a predetermined distance;

lens means rotatably mounted for synchronous movement with said focusing means about a second axis spaced from and parallel with said first axis, said lens means being adjustable to define a sharply defined image of a photographic object located the predetermined distance therefrom at a focal plane of the photographic camera;

means for connecting said focusing means and said lens means being rotatably mounted for rotation about a third axis spaced from and parallel with said first and second axes whereby said focusing and lens means are synchronously moved for focusing the sharply defined image of the photographic object at the focal plane of the camera;

a viewing station included upon a surface of said housing;

means for indicating at said viewing station a distance at which said lens means is focused, said indicating means being mounted for synchronous movement with said focusing and lens means and including an indicia bearing member adapted to provide a scale the measurements of which are graduated so as to present an identifying character at said viewing station which correlates the sharply focused position of said lens means with the predetermined distance of the photographic object; and means for coupling said indicating means to at least one of said focusing means and said lens means, said coupling means being rotatably mounted for rotation about a fourth axis spaced from and parallel with said first, second and third axes whereby said indicating means is moved synchronously with said focusing means for presenting the identifying characters at said viewing station.

* * * * *